J. H. D. ROSAN.
WHEEL LIFT.
APPLICATION FILED JUNE 26, 1906.
915,889.
Patented Mar. 23, 1909.
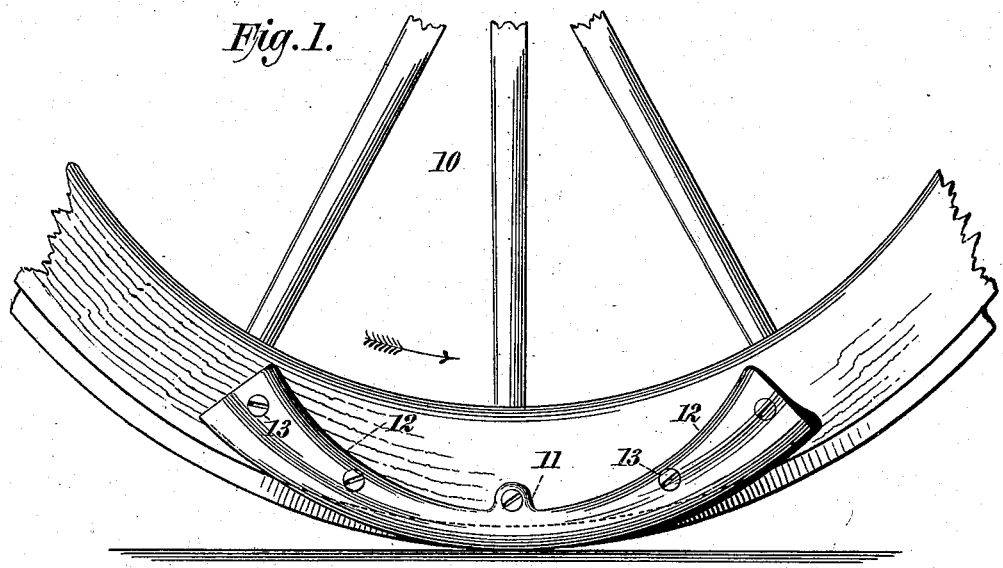
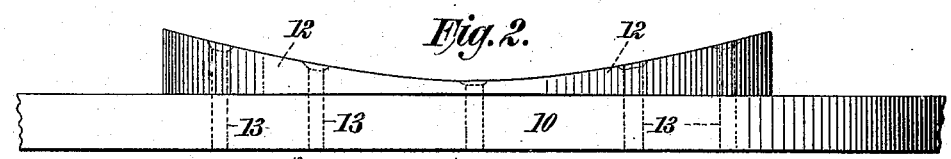
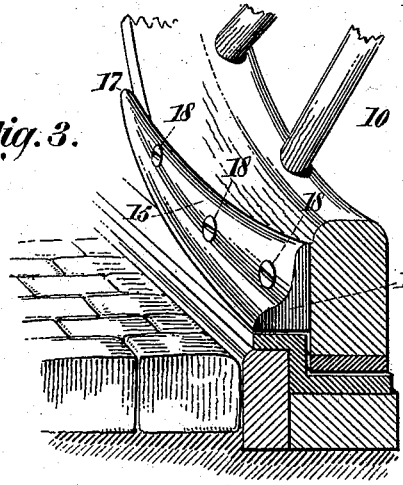
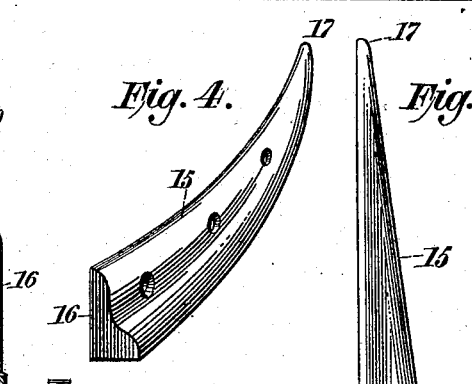
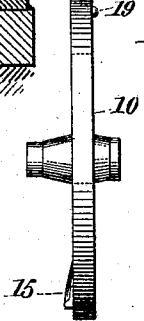
WITNESSES:
INVENTOR
Joseph H. D. Rosan
BY
his ATTORNEYS.

UNITED STATES PATENT OFFICE.

JOSEPH H. D. ROSAN, OF NEW YORK, N. Y.

WHEEL-LIFT.

No. 915,889.  Specification of Letters Patent.  Patented March 23, 1909.

Application filed June 26, 1906. Serial No. 323,440.

*To all whom it may concern:*

Be it known that I, JOSEPH H. D. ROSAN, a citizen of the United States, residing at the city of New York, borough of Brooklyn, Kings county, in the State of New York, have invented certain new and useful Improvements in Wheel-Lifts, of which the following is a full, clear, and exact specification.

My invention relates to improvements in vehicle wheels and the same has for its object more particularly to provide a simple, efficient and reliable device which may be readily applied to the wheels of a vehicle in such a way that it will act to lift a wheel to the upper level of a car track or analogous obstruction, and permit of a change of direction of the vehicle.

Further said invention has for its object to provide a means for indicating to the driver, while in his seat on the vehicle, when the lift arranged upon the wheel has assumed the proper position to permit of the wheel being turned aside.

To the attainment of the aforesaid objects and ends my invention consists in the novel details of construction, and in the combination, connection and arrangement of parts hereinafter more fully described and then pointed out in the claims.

In the accompanying drawings forming part of this specification, wherein like numerals of reference indicate like parts, Figure 1 is a side view showing a portion of a vehicle wheel provided with one form of a lift constructed according to and embodying my said invention; Fig. 2 is a bottom view of the same; Fig. 3 is a detail perspective view partly in section, showing another form of lift applied to the left wheel of a vehicle; Fig. 4 is a detail perspective view of a right lift detached from the wheel; Fig. 5 is a top or edge view of the same, and Fig. 6 is an edge view of a wheel on a smaller scale showing the lift and indicating means arranged thereon.

In said drawings 10 designates a vehicle wheel of usual construction, and 11 denotes a shoe applied thereto. At Figs. 1 and 2 the shoe is shown of a double construction to permit of the wheel being raised in the course of the rotation of the wheel in both directions, and in the remaining figures is shown a single form of shoe which, as shown applied at Fig. 3, is adapted to raise the wheel in the course of its rotation in one direction only.

Referring particularly to Figs. 1 and 2 of the drawings, the shoe 11 is shown composed of two similarly shaped parts 12, 12 formed of metal or other suitable material, and secured upon the outer vertical surface of the felly or rim by means of screws or bolts 13, 13. The said shoe has its lower surface formed in the arc of a circle of diameter considerably less than the diameter of the wheel itself and has its rounded horizontal edge arranged eccentrically to the wheel.

The curved horizontal surface or tread of the shoe is preferably made in breadths varying from one-half to one inch or more at its opposite ends, and diminishing in width as the center of the device is approached where the said horizontal surface or tread varies from one-eighth to three-eighths of an inch. The width of said tread at the ends of the shoe and center depending upon the size of the vehicle upon which the devices are to be used. The shoe is so applied to the outer side of the wheel felly that the lower side or tread at its narrowest portion,—that is, the center of the device shown at Figs. 1 and 2, will be in the same horizontal plane with a line extending transversely across the tire of the vehicle, while the broader ends of the device are disposed at some distance in from the outer surface of the tire, so that the device will operate as a cam adapted to work upon the upper horizontal surface of a rail when the wheel is revolving in either direction, and thereby operate to lift the wheel up.

In the construction shown at Figs. 3 to 6 inclusive, the shoe 15 is shown of a single form. It will, of course, be quite obvious that the device illustrated at Figs. 1 and 2 is merely the single form duplicated, that is to say, two of said single shoes have been arranged end to end and secured together at their smaller ends, in order to provide a stronger structure and return the wheel gradually to the lower level of the track when not wanting to withdraw the vehicle from the track, this being one of the main features of the double shoe.

The single device 15 is shown as of substantially triangular form in cross-section at its large end 16, and diminishing both in height and width therefrom as it approaches its smaller end where it terminates almost in a point 17. The shoe is secured with its vertical edge toward the wheel rim or felly by means of screws or bolts 18, 18 and has its horizontal curved tread at its pointed end 17 arranged parallel transversely with the outer surface of the wheel tire, while its larger and wider end is arranged some distance inward therefrom.

Upon the inner surface of the wheel rim at the side diametrically opposite to the pointed end of the shoe, or where the double structure is employed, opposite to the center of said device, is secured a stud or button 19, for the purpose of enabling the driver of the vehicle to determine from his seat when the pointed end, or joined pointed ends of the device, as the case may be, is in position to permit of the wheels being turned aside, and out of the track or rut.

The operation of the device is as follows: Assuming that the wheel is revolving in the direction of the arrow, Fig. 1, and to be traveling in a car track, it simply becomes necessary for the driver to guide the horses so as to cause the outer surface of the wheel rim to contact with the vertical side or portion of the track, as shown at Fig. 3, and as the horizontal surface or tread of the device at its broad end 18 contacts with the upper horizontal surface of the rail, and the wheel continues to revolve, it will lift the same to the upper surface of the track as the pointed end 17 of the shoe contacts with the rail. This may easily be determined by the driver by reference to the position of the stud or button 19 on the inner surface of the wheel rim.
When the vehicle is moving backward and the wheel consequently caused to revolve in the reverse direction, the opposite part of the device will be brought into play and operate as hereinabove described.
Having thus described my invention, what I claim and desire to secure by Letters Patent is:

1. The combination with a vehicle wheel, of a shoe secured upon the side thereof adjacent to the tire having a curved, tapering tread and arranged eccentrically to the circumference of said wheel with its bearing surface transversely parallel to said tire, substantially as specified.

2. The combination with a vehicle wheel, of a shoe arranged upon the side thereof adjacent to the tire, having a curved tapering tread arranged eccentrically to the circumference of said wheel, and the smaller portion of said tread arranged transversely parallel with the outer surface of the tire, substantially as specified.

3. The combination with a vehicle wheel, of a shoe arranged upon the side thereof wholly within the circumference of the wheel, means for securing said shoe to a wheel, said shoe having a curved tread diminishing in width from its ends toward the center, and the smallest portion of its tread disposed transversely parallel with the outer surface of the tire, substantially as specified.

4. The combination with a vehicle wheel, of a shoe arranged upon the side thereof wholly within the circumference of the wheel, means for securing said shoe to a wheel eccentrically to the circumference of said wheel, said shoe having a curved tread diminishing in width from its ends toward the center, and the smallest portion of its tread disposed transversely parallel with the outer surface of the tire, substantially as specified.

Signed at the city of New York, in the county and State of New York, this 25th day of June, nineteen hundred and six.

JOSEPH H. D. ROSAN.

Witnesses:
A. R. ANGUS,
JOHN A. STRALEY.